United States Patent
Wen et al.

(10) Patent No.: US 9,875,279 B2
(45) Date of Patent: Jan. 23, 2018

(54) DATA SCANNING METHOD AND APPARATUS

(71) Applicant: Huawei Technologies Co., Ltd., Shenzhen (CN)

(72) Inventors: Jijun Wen, Beijing (CN); Zhongqing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 578 days.

(21) Appl. No.: 14/585,874

(22) Filed: Dec. 30, 2014

(65) Prior Publication Data

US 2015/0169690 A1    Jun. 18, 2015

Related U.S. Application Data

(63) Continuation of application No. PCT/CN2014/081825, filed on Jul. 8, 2014.

(30) Foreign Application Priority Data

Dec. 17, 2013  (CN) .......................... 2013 1 0695039

(51) Int. Cl.
*G06F 17/30* (2006.01)

(52) U.S. Cl.
CPC .. *G06F 17/30469* (2013.01); *G06F 17/30289* (2013.01)

(58) Field of Classification Search
CPC ......... G06F 17/30445; G06F 17/30545; G06F 17/30463; G06F 17/30442;

(Continued)

(56) References Cited

U.S. PATENT DOCUMENTS 6,738,756 B1 * 5/2004 Brown .............. G06F 17/30445
6,778,977 B1   8/2004 Avadhanam et al.

(Continued)

FOREIGN PATENT DOCUMENTS

CN   101410836 A   4/2009
CN   101739451 A   6/2010

(Continued)

OTHER PUBLICATIONS

Xu, L., et al., "Design and Realization of a Parallel Query Optimizer," Computer Engineering and Science, vol. 29, No. 2, 2007, pp. 104-141.

(Continued)

*Primary Examiner* — Evan Aspinwall
(74) *Attorney, Agent, or Firm* — Conley Rose, P.C.

(57) ABSTRACT

A data scanning method and apparatus are provided. The method includes analyzing a data scanning condition carried in a received data scanning request and determining at least one target data partition used to store data, acquiring a scanning cost of the target data partition, where the scanning cost includes waiting time of data scanning, allocating the target data partition to a processing resource according to the scanning cost so as to execute parallel data scanning, and acquiring a scanning result returned by the processing resource. In the present invention, statistics information of a data partition is collected, a scanning cost is acquired, and a target-data-partition operation group is appropriately allocated to a processing resource, thereby shortening waiting time of the whole data scanning.

19 Claims, 7 Drawing Sheets

(58) Field of Classification Search
CPC ....... G06F 2209/5017; G06F 17/30563; G06F 17/30584; G06F 9/5066; G06F 9/5083; G06F 17/30283; G06F 17/30224; G06F 2209/5018; G06F 17/30469; G06F 17/30289; G06F 2209/05
USPC .......................................... 707/600; 700/600
See application file for complete search history.

(56) References Cited

U.S. PATENT DOCUMENTS

| | | |
|---|---|---|
| 8,332,595 B2 | 12/2012 | Gosalia et al. |
| 2004/0122845 A1* | 6/2004 | Lohman ............ G06F 17/30445 |
| 2004/0199530 A1* | 10/2004 | Avadhanam ...... G06F 17/30327 |
| 2005/0081210 A1* | 4/2005 | Day ...................... G06F 9/5016 |
| | | 718/104 |
| 2006/0080285 A1* | 4/2006 | Chowdhuri ....... G06F 17/30445 |
| 2006/0218123 A1* | 9/2006 | Chowdhuri ....... G06F 17/30445 |
| 2007/0250470 A1* | 10/2007 | Duffy ................ G06F 17/30445 |
| 2008/0109813 A1* | 5/2008 | Narita .................. G06F 9/5038 |
| | | 718/104 |
| 2008/0243768 A1* | 10/2008 | Freedman ......... G06F 17/30445 |
| 2009/0013325 A1* | 1/2009 | Kobayashi ........ G06F 17/30445 |
| | | 718/104 |
| 2009/0083277 A1* | 3/2009 | Barsness .......... G06F 17/30445 |
| 2009/0204583 A1 | 8/2009 | Hechler et al. |
| 2010/0312762 A1 | 12/2010 | Yan et al. |
| 2011/0285709 A1* | 11/2011 | Mejdrich .............. G06T 15/005 |
| | | 345/426 |
| 2012/0084278 A1* | 4/2012 | Franke .............. G06F 17/30587 |
| | | 707/719 |
| 2013/0166865 A1 | 6/2013 | Lemberg et al. |
| 2013/0173594 A1 | 7/2013 | Xu et al. |

FOREIGN PATENT DOCUMENTS

| | | |
|---|---|---|
| CN | 101908003 A | 12/2010 |
| CN | 103064875 A | 4/2013 |
| CN | 103729417 A | 4/2014 |
| WO | 2013003031 A2 | 1/2013 |

OTHER PUBLICATIONS

English Translation of Xu, L., et al., "Design and Realization of a Parallel Query Optimizer," Computer Engineering and Science, vol. 29, No. 2, 2007, translation dated Aug. 10, 2016, 6 pages.

Foreign Communication From a Counterpart Application, Chinese Application No. 201310695039.5, Chinese Search Report dated Jun. 6, 2016, 2 pages.

Foreign Communication From a Counterpart Application, Chinese Application No. 201310695039.5, Chinese Office Action dated Jun. 29, 2016, 5 pages.

Nehme, R., et al., "Automated Partitioning Design in Parallel Database Systems," Proceedings of the 2011 ACM SIGMOD International Conference on Management of Data, Jun. 12-16, 2011, pp. 1137-1148.

Foreign Communication From a Counterpart Application, European Application No. 14812115.5, Extended European Search Report dated Dec. 8, 2015, 8 pages.

Partial English Translation and Abstract of Chinese Patent Application No. CN103729417A, Jan. 29, 2015, 5 pages.

Foreign Communication From a Counterpart Application, PCT Application No. PCT/CN2014/081825, International Search Report dated Sep. 26, 2014, 8 pages.

Foreign Communication From a Counterpart Application, PCT Application No. PCT/CN2014/081825, Written Opinion dated Sep. 26, 2014, 5 pages.

* cited by examiner

DATA SCANNING METHOD AND APPARATUS

CROSS-REFERENCE TO RELATED APPLICATIONS

This application is a continuation of International Application No. PCT/CN2014/081825, filed on Jul. 8, 2014, which claims priority to Chinese Patent Application No. 201310695039.5, filed on Dec. 17, 2013, both of which are hereby incorporated by reference in their entireties.

TECHNICAL FIELD

The present invention relates to the field of data storage and retrieval technologies, and in particular, to a data scanning method and apparatus.

BACKGROUND

In a computer system, various letters, combinations of numeric symbols, voices, graphics, images, and so on are generally called data. With the development of technologies such as a social network and an Internet of Things, data keeps increasing at an exponential rate. Increase of a data size also imposes a higher requirement on data retrieval.

Data in a large-size data table is divided into multiple small physical or logical tables according to a policy, and the small tables are stored in different storage units, where each storage unit is a partition. A partition that needs to be scanned is allocated to an idle worker, namely, a processing resource, for example, a processing resource such as a central processing unit (CPU), a thread, a process, or a host; and scanning of a corresponding partition is implemented by these workers.

However, although corresponding required data can be found by using the foregoing retrieval technology, excessively long scanning time of one or more workers may be caused when there is a large data size difference between partitions, thereby leading to excessively long waiting time of a whole retrieval process.

SUMMARY

A technical problem to be solved in embodiments of the present invention is to provide a data scanning method and apparatus, which can shorten waiting time of a whole retrieval and scanning process.

To solve the foregoing technical problem, a first aspect of the present invention provides a data scanning method including analyzing a data scanning condition carried in a received data scanning request and determining at least one target data partition used to store data, acquiring a scanning cost of the target data partition, where the scanning cost includes waiting time of data scanning, allocating the target data partition to a processing resource according to the scanning cost so as to execute parallel data scanning, and acquiring a scanning result returned by the processing resource.

In a first possible implementation manner, before the analyzing a data scanning condition carried in a received data scanning request, the method further includes collecting statistics information of a data partition, where the statistics information includes a data volume of the data partition and access performance of a storage medium, and acquiring and configuring a scanning cost corresponding to the data partition according to the data volume of the data partition and the access performance of the storage medium in the statistics information.

With reference to the first possible implementation manner of the first aspect, in a second possible implementation manner, the collecting statistics information of a data partition includes scanning all data of each data partition and computing the data volume of the data partition, or performing sampling on data of the data partition to estimate the data volume of the data partition, or estimating a current data volume according to a data operation that is performed on the data partition after statistics of a data volume is collected for the data partition last time, and pre-configuring the access performance of the storage medium of the data partition, or executing data sampling on the data partition for at least one time, so as to determine the access performance of the storage medium of the data partition.

With reference to the second possible implementation manner of the first aspect, in a third possible implementation manner, before the collecting statistics information of a data partition, the method further includes triggering, according to an event or in a periodical manner, an operation of collecting the statistics information of the data partition.

With reference to the first aspect, in a fourth possible implementation manner, the allocating, according to the scanning cost, the target data partition to a processing resource, so as to execute parallel scanning includes computing an appropriate target-data-partition operation group according to a scanning cost of each target data partition so that a difference between a scanning cost of each group and an average value of scanning costs of all operation groups falls within a preset range, where the operation group includes scanning of one or more target data partitions, and allocating the operation group to the processing resource so as to execute the parallel scanning.

With reference to the fourth possible implementation manner of the first aspect, in a fifth possible implementation manner, after the allocating the target data partition to a processing resource according to the scanning cost so as to execute parallel data scanning, and acquiring a scanning result returned by the processing resource, the method further includes sending an acquired scanning result of the processing resource to an initiator of the data scanning request.

Correspondingly, a second aspect of the present invention provides a data scanning apparatus, including a determining module configured to analyze a data scanning condition carried in a received data scanning request and determine at least one target data partition used to store data, a first acquiring module configured to acquire a scanning cost of the target data partition, where the scanning cost includes waiting time of data scanning, and a scanning configuration module configured to allocate the target data partition to a processing resource according to the scanning cost so as to execute parallel data scanning, and acquire a scanning result returned by the processing resource.

In a first possible implementation manner, the apparatus further includes a collecting module configured to collect statistics information of a data partition, where the statistics information includes a data volume of the data partition and access performance of a storage medium, and a second acquiring module configured to acquire and configure a scanning cost corresponding to the data partition according to the data volume of the data partition and the access performance of the storage medium in the statistics information.

With reference to the first possible implementation manner of the second aspect, in a second possible implementation manner, the collecting module includes a first statistics-collecting unit configured to scan all data of each data partition and compute the data volume of the data partition, or perform sampling on data of the data partition to estimate the data volume of the data partition, or estimate a current data volume according to a data operation that is performed on the data partition after statistics of a data volume is collected for the data partition last time, and a second statistics-collecting unit configured to pre-configure the access performance of the storage medium of the data partition or execute data sampling on the data partition for at least one time so as to determine the access performance of the storage medium of the data partition.

With reference to the second possible implementation manner of the second aspect, in a third possible implementation manner, the apparatus further includes a triggering module configured to trigger, according to an event or in a periodical manner, an operation of collecting the statistics information by the collecting module.

With reference to the second aspect, in a fourth possible implementation manner, the scanning configuration module includes a computing unit configured to compute an appropriate target-data-partition operation group according to a scanning cost of each target data partition so that a difference between a scanning cost of each group and an average value of scanning costs of all operation groups falls within a preset range, where the operation group includes scanning of one or more target data partitions, a configuring unit configured to allocate the operation group to the processing resource so as to execute the parallel data scanning, and an acquiring unit configured to acquire a scanning result returned by the processing resource.

With reference to the fourth possible implementation manner of the second aspect, in a fifth possible implementation manner, the apparatus further includes a sending module configured to send the acquired scanning result of the processing resource to an initiator of the data scanning request.

Correspondingly, a third aspect of the present invention provides a data scanning apparatus, including a memory, a processor, and a communications interface, where the communications interface is configured to receive a data scanning request or send a data scanning result to a device that initiates the data scanning request, the memory stores a group of program code, and the processor is configured to invoke the program code stored in the memory and is configured to execute the following operations: analyzing a data scanning condition that is carried in the data scanning request received by the communications interface, determining at least one target data partition used to store data, acquiring a scanning cost of the target data partition, where the scanning cost includes waiting time of data scanning, allocating the target data partition to a processing resource according to the scanning cost so as to execute parallel data scanning, and acquiring a scanning result returned by the processing resource.

In a first possible implementation manner of the third aspect, before the processor analyzes the data scanning condition that is carried in the data scanning request received by the communications interface, the processor is configured to invoke the program code stored in the memory, and is further configured to execute the following operations: collecting statistics information of a data partition, where the statistics information includes a data volume of the data partition and access performance of a storage medium, and acquiring and configuring a scanning cost corresponding to the data partition according to the data volume of the data partition and the access performance of the storage medium in the statistics information.

With reference to the first possible implementation manner of the third aspect, in a second possible implementation manner of the third aspect, a specific manner of collecting statistics information of the data partition by the processor is scanning all data of each data partition and computing the data volume of the data partition, performing sampling on data of the data partition to estimate the data volume of the data partition, or estimating a current data volume according to a data operation that is performed on the data partition after statistics of a data volume is collected for the data partition last time, and pre-configuring the access performance of the storage medium of the data partition or executing data sampling on the data partition for at least one time so as to determine the access performance of the storage medium of the data partition.

With reference to the first possible implementation manner of the third aspect, in a third possible implementation manner of the third aspect, before the processor collects the statistics information of the data partition, the processor is configured to invoke the program code stored in the memory, and is further configured to execute the following operations: triggering, according to an event or in a periodical manner, an operation of collecting the statistics information of the data partition.

With reference to the third aspect, in a fourth possible implementation manner of the third aspect, a specific manner of allocating the target data partition to the processing resource by the processor according to the scanning cost so as to execute the parallel data scanning includes computing an appropriate target-data-partition operation group according to a scanning cost of each target data partition so that a difference between a scanning cost of each group and an average value of scanning costs of all operation groups falls within a preset range, where the operation group includes scanning of one or more target data partitions, and allocating the operation group to the processing resource so as to execute the parallel scanning.

With reference to the third aspect or the fourth possible implementation manner of the third aspect, in a fifth possible implementation manner of the third aspect, the processor is configured to invoke the program code stored in the memory, and is further configured to execute the following operations: sending an acquired scanning result of the processing resource to an initiator of the data scanning request.

It can be seen from the foregoing that, in some feasible implementation manners of the present invention, by determining a to-be-scanned target data partition and according to a scanning cost of an acquired target data partition, the target data partition is appropriately allocated to a processing resource to execute parallel scanning, thereby shortening waiting time for acquiring a scanning result of the processing resource.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
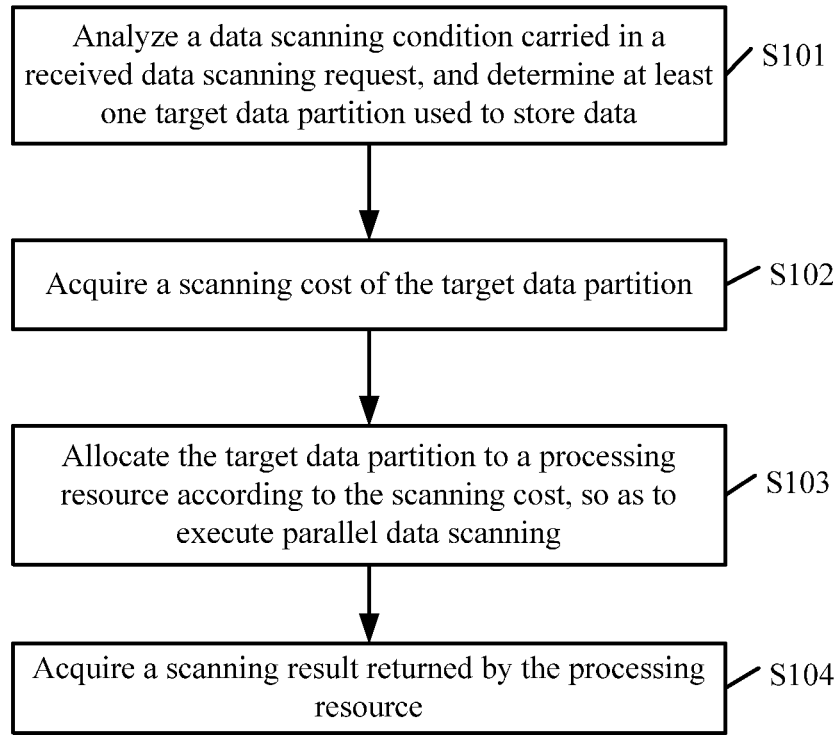
FIG. 1 is a schematic flowchart of a data scanning method according to an embodiment of the present invention.

FIG. 1 is a schematic flowchart of a data scanning method according to an embodiment of the present invention. The method in the embodiment of the present invention may be applied to a terminal such as a mobile phone, a computer, a mobile device, or a server. Specifically, the method includes the following steps.

S101: Analyze a data scanning condition carried in a received data scanning request and determine at least one target data partition used to store data.

Data partitioning indicates that a piece of relatively-large-size data is partitioned into multiple relatively small data portions according to a policy, such as time, content, or a format, and each data portion is a data partition.

When a data scanning request sent by a requester is received, a data scanning condition in the data scanning request, such as a data partition that needs to be scanned and target information to be scanned, is analyzed. Some data partitions that do not meet the condition are filtered out according to the scanning condition and the data partition that needs to be scanned is called a target data partition, where there are target data partitions 1 to K.

S102: Acquire a scanning cost of the target data partition.

The scanning cost includes waiting time of data scanning, and longer waiting time increases a scanning cost, and shorter waiting time decreases a scanning cost.

The scanning cost of the target data partition may be acquired from a scanning cost table, which is preset by a system, of each data partition, that is, statistics information of each data partition is collected by a local apparatus for computing data partition statistics information, where the statistics information mainly includes a data size (a data size is a data volume of a partition) of each data partition, and access performance (which is described by using scanning time of unit data) of a storage medium in which each data partition is located. The collecting process may be triggered by an initiator event requiring scanning or by a local end in a periodical manner. The data size may be obtained by estimation according to data in the data partition, a historical operation of a user on the data partition, or the like. A scanning cost of each data partition is estimated according to the data size and the access performance in the statistics information, and the access performance may be computed by adding the scanning costs of the data partitions.

S103: Allocate the target data partition to a processing resource according to the scanning cost so as to execute parallel data scanning, and S104 acquire a scanning result returned by the processing resource.

Optionally, first, the number of operation groups that need to be allocated for all target data partitions is computed according to the scanning cost, acquired in step S102, of the target data partition, and an idle processing resource (also called an idle worker, for example, a processing resource such as a CPU, a thread, a process, or a host) in a worker pool, where the operation group includes tasks of scanning one or more target data partitions. Then, an average scanning cost of the operation group is computed according to the number of operation groups. Then, the target data partitions are allocated to the operation groups so that a difference between a scanning cost of each group and the average scanning cost falls within a preset range. Finally, a scanning result is collected by a local scanning result convergence apparatus and is sent to an initiator of the data scanning request.

It can be seen from the foregoing that, in the embodiment of the present invention, by determining a to-be-scanned target data partition and a scanning cost of the target data partition, corresponding computing processing is performed, and the target data partition, after being grouped, is allocated to a processing resource to execute scanning, thereby avoiding a problem that total scanning time is excessively long due to imbalanced tasks of processing resources, that is, shortening waiting time of data scanning.

Figure 2:
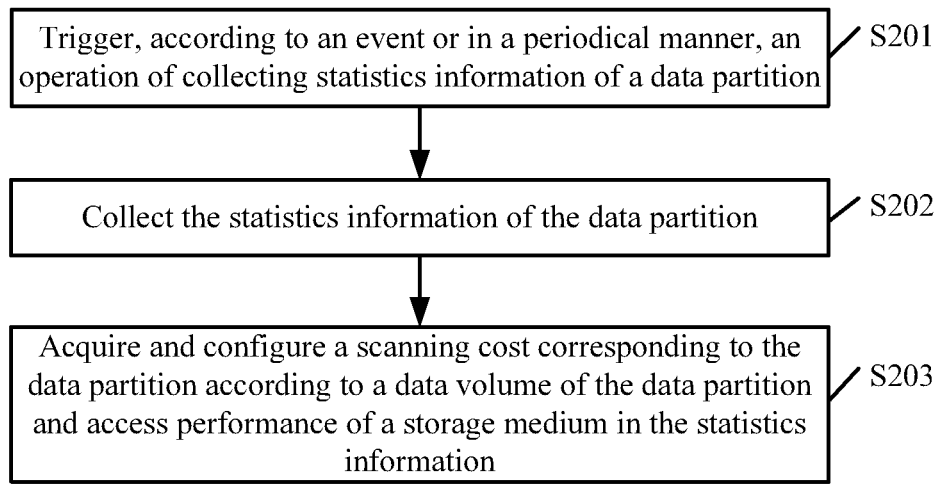
FIG. 2 is a schematic flowchart of a method for acquiring a scanning cost of a data partition according to an embodiment of the present invention.

FIG. 2 is a schematic flowchart of a method for acquiring a scanning cost of a data partition according to an embodiment of the present invention. The method described in the embodiment of the present invention may be executed before step S101 in the foregoing embodiment corresponding to FIG. 1, and a specific method in the embodiment of the present invention is as follows.

S201: Trigger, according to an event or in a periodical manner, an operation of collecting statistics information of a data partition.

The event includes a mouse clicking event, a keyboard event, an operating system event, and an event triggered by an application program according to a running status of software and hardware. Periodical triggering includes that a local end executes an operation, such as collecting statistics information, at a regular time interval by setting a timer.

The statistics information includes a data size of the data partition, namely a data volume, and access performance of a storage medium in which the data partition is located.

S202: Collect the statistics information of the data partition.

After a collecting operation is triggered in S201, the local end collects the statistics information of the data partition. A specific collecting manner is: (1) collecting a data size of the data partition by means of scanning all data of each data partition, and computing a data volume of the data partition, or performing sampling on data of the data partition to estimate a data volume of the data partition; or estimating a current data volume according to a data operation, for example, deletion or adding, which is performed on the data partition after statistics of a data volume is collected for the data partition during collection last time (2) collecting access performance of a storage medium of the data partition by means of presetting access performance (unit time for scanning time) of a storage medium of the data partition, that is, manual configuration, or by means of obtaining access performance of a storage medium by averaging scanning time of accessing the data partition for multiple times.

S203: Acquire and configure a scanning cost corresponding to the data partition according to a data volume of the data partition and access performance of a storage medium in the statistics information.

Specifically, the scanning cost corresponding to the data partition is computed according to the data volume of the data partition and the access performance of the storage medium in multiple manners. For example, a scanning cost of a data partition=A data size of a data partition * Access performance of a storage medium.

According to the embodiment of the present invention, the following table 1 provides an example of a correspondence between data partitions 1 to K and a scanning cost:

TABLE 1

| Data partition | Scanning cost (sec) |
| --- | --- |
| Data partition 1 | 10 |
| Data partition 2 | 15 |
| . | . |
| . | . |
| . | . |
| Data partition K − 1 | 30 |
| Data partition K | 40 |

If a scanning cost table, which is similar to Table 1, of each data partition has been obtained before step S101 in the foregoing embodiment, when step S102 is executed, a scanning cost of a target data partition may be acquired in a timely manner, so as to perform grouping properly and shorten waiting time of scanning.

Figure 3:
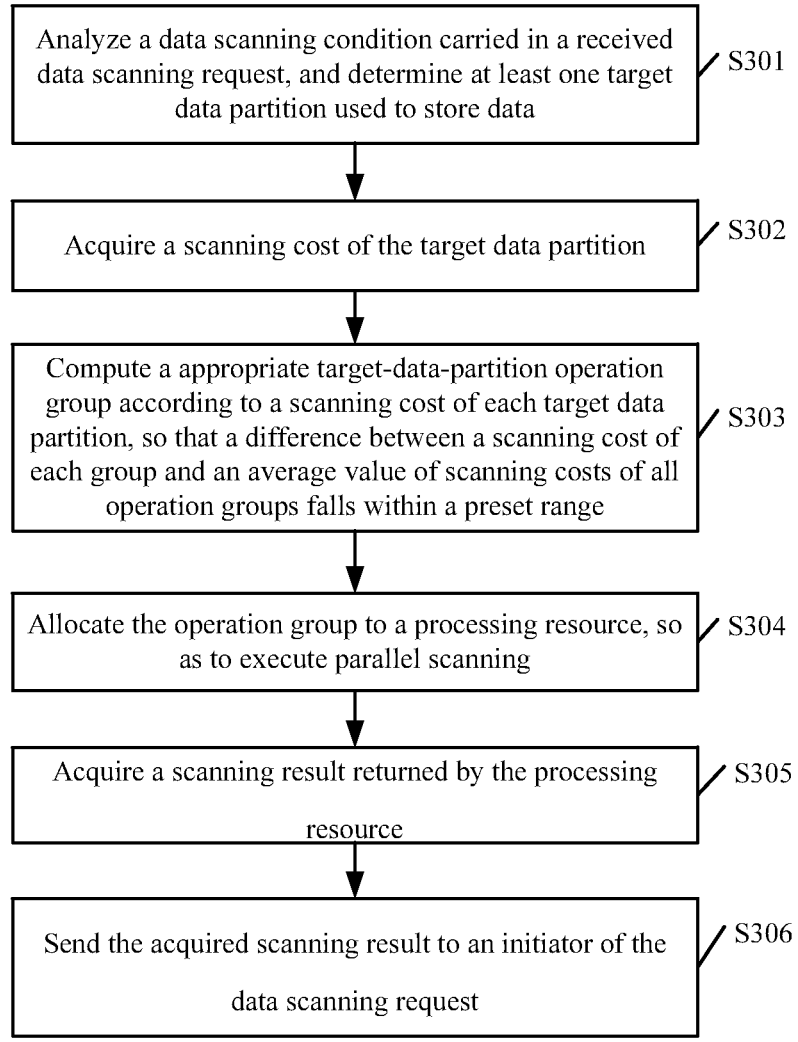
FIG. 3 is a schematic flowchart of another data scanning method according to an embodiment of the present invention.

FIG. 3 is a schematic flowchart of another data scanning method according to an embodiment of the present invention. The method in the embodiment of the present invention may be applied to a terminal such as a mobile phone, a computer, a mobile device, or a server. Specifically, the method includes the following steps:

S301: Analyze a data scanning condition carried in a received data scanning request and determine at least one target data partition used to store data.

Some data partitions that do not meet the condition may also be filtered out according to the data scanning condition and a to-be-scanned data partition that meets the condition is used as a target data partition.

S302: Acquire a scanning cost of the target data partition.

The scanning cost of the target data partition may be acquired from a table of a correspondence between a data partition and a scanning cost by using the method in the foregoing embodiment.

S303: Compute an appropriate target-data-partition operation group according to a scanning cost of each target data partition so that a difference between a scanning cost of each group and an average value of scanning costs of all operation groups falls within a preset range.

The operation group includes tasks of scanning one or more target data partitions.

S304: Allocate the operation group to a processing resource so as to execute parallel scanning.

S305: Acquire a scanning result returned by the processing resource.

The processing resource may return one result after scanning one target data partition or may return all scanning results after scanning a batch of target data partitions.

S306: Send the acquired scanning result to an initiator of the data scanning request.

In the embodiment of the present invention, by collecting a data volume of a data partition and access performance of a storage medium in which the data partition is located, a scanning cost of each data partition is estimated and then an appropriate target-data-partition group (an operation group) is computed and allocated to an idle processing resource so that scanning time of each operation group is close to an average value of scanning costs of all operation groups. A scanning result is returned to an initiator of a data scanning request by the processing resource, namely a worker, thereby shortening waiting time of the whole scanning.

Figure 4:
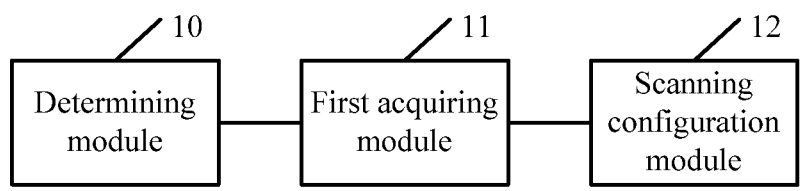
FIG. 4 is a schematic structural diagram of a data scanning apparatus according to an embodiment of the present invention.

FIG. 4 is a schematic structural diagram of a data scanning apparatus according to an embodiment of the present invention. The data scanning apparatus includes a determining module 10, a first acquiring module 11, and a scanning configuration module 12.

The determining module 10 is configured to analyze a data scanning condition carried in a received data scanning request and determine at least one target data partition used to store data.

Data partitioning indicates that a piece of relatively-large-size data is partitioned into multiple relatively small data portions according to a policy, such as time, content, or a format, and each data portion is a data partition.

When receiving a data scanning request sent by a requester, the determining module 10 analyzes a data scanning condition in the data scanning request, for example, a data partition that needs to be scanned and target information to be scanned. Some data partitions that do not meet the condition are filtered out according to the scanning condition, and the data partition that needs to be scanned is called a target data partition, where there are target data partitions 1 to K.

The first acquiring module 11 is configured to acquire a scanning cost of the target data partition.

The scanning cost includes waiting time of data scanning, and longer waiting time increases a scanning cost, and vice versa.

The first acquiring module 11 may acquire the scanning cost of the target data partition from a scanning cost table, which is preset by a system, of each data partition, that is, statistics information of each data partition is collected by a local apparatus for computing data partition statistics information, where the statistics information mainly includes a data size (a data size is a data volume of a partition) of each data partition, and access performance (which is described by using scanning time of unit data) of a storage medium in which each data partition is located. The collecting process may be triggered by an event of an initiator requiring scanning or by a local end in a periodical manner. The data size may be obtained by estimation according to data in the data partition, a historical operation of a user on the data partition, or the like. A scanning cost of each data partition is estimated according to the data size and the access performance in the statistics information, and the access performance may be computed by adding the scanning costs of the data partitions.

The scanning configuration module 12 is configured to allocate the target data partition to a processing resource according to the scanning cost so as to execute parallel data scanning and acquire a scanning result returned by the processing resource.

Optionally, first, the number of operation groups that need to be allocated to all target data partitions is computed according to the scanning cost, acquired by the first acquiring module 11, of each target data partition and an idle processing resource (also called an idle worker, for example, a processing resource such as a CPU, a thread, a process, or a host) in a worker pool, where the operation group includes tasks of scanning one or more target data partitions. Then, an average scanning cost of the operation group is computed according to the number of operation groups. Then, the target data partitions are allocated to the operation groups so that a difference between a scanning cost of each group and the average scanning cost falls within a preset range. Finally, a scanning result is collected by a local scanning result convergence apparatus and is sent to an initiator of the data scanning request.

It can be seen from the foregoing that, in the embodiment of the present invention, by acquiring a to-be-scanned target data partition and a scanning cost of the target data partition, corresponding computing processing is performed, and the target data partition, after being grouped, is allocated to a processing resource to execute scanning, thereby avoiding a problem that total scanning time is excessively long due to imbalanced tasks of processing resources, that is, shortening waiting time of data scanning.

Figure 5:
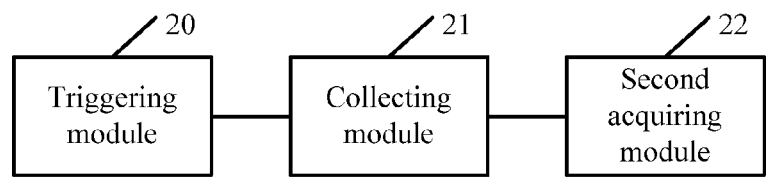
FIG. 5 is a schematic structural diagram of an apparatus for acquiring a scanning cost of a data partition according to an embodiment of the present invention.

FIG. 5 is a schematic structural diagram of an apparatus for acquiring a scanning cost of a data partition according to an embodiment of the present invention. The apparatus described in the embodiment of the present invention may be configured to acquire a scanning cost of a target data partition in the foregoing embodiment. The apparatus includes a triggering module 20, a collecting module 21, and a second acquiring module 22, where the triggering module 20 is configured to trigger, according to an event or in a periodical manner, an operation of collecting statistics information by a collecting module 21.

The event is a message sent by an object, for example, a mouse clicking event, a keyboard event, and various operating system event so that a local end needs to execute an operation, such as collecting statistics information. Periodical triggering refers to that the local end executes the operation, such as collecting the statistics information, at a regular time interval by setting a timer.

The statistics information includes a data size of the data partition, namely a data volume, and access performance of a storage medium in which the data partition is located.

The collecting module 21 is configured to collect statistics information of the data partition, where the statistics information includes the data volume of the data partition and the access performance of the storage medium.

The second acquiring module 22 is configured to acquire and configure a scanning cost corresponding to the data partition according to the data volume of the data partition and the access performance of the storage medium in the statistics information.

Figure 6:
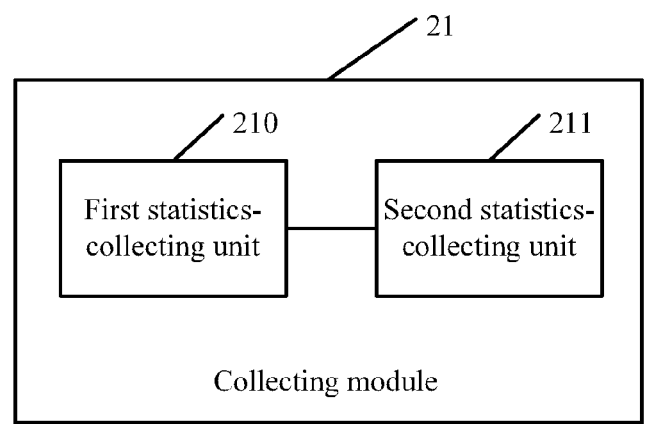
FIG. 6 is a specific schematic structural diagram of a collecting module in FIG. 5.

As shown in FIG. 6, the collecting module 21 includes a first statistics-collecting unit 210 configured to scan all data of each data partition and compute the data volume of the data partition, perform sampling on data of the data partition to estimate the data volume of the data partition, or estimate a current data volume according to a data operation that is performed on the data partition after statistics of a data volume is collected for the data partition last time and a second statistics-collecting unit 211 configured to pre-configure the access performance of the storage medium of the data partition or execute data sampling on the data partition for at least one time so as to determine the access performance of the storage medium of the data partition.

When event-based triggering or periodical triggering is performed, the apparatus for acquiring a scanning cost described in the embodiment of the present invention may collect statistics information of each data partition to compute a scanning cost of each data partition and generate a correspondence between a data partition and a scanning cost so that the scanning cost is acquired in a data scanning process to shorten waiting time of scanning.

Figure 7:
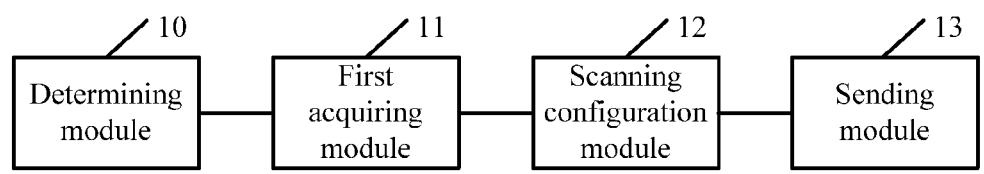
FIG. 7 is a schematic structural diagram of another data scanning apparatus according to an embodiment of the present invention.

FIG. 7 is a schematic structural diagram of another data scanning apparatus according to an embodiment of the present invention. Apart from the determining module 10, the first acquiring module 11, and the scanning configuration module 12 in the foregoing embodiment, the apparatus further includes a sending module 13 configured to send the acquired scanning result of the processing resource to an initiator of a data scanning request.

Figure 8:
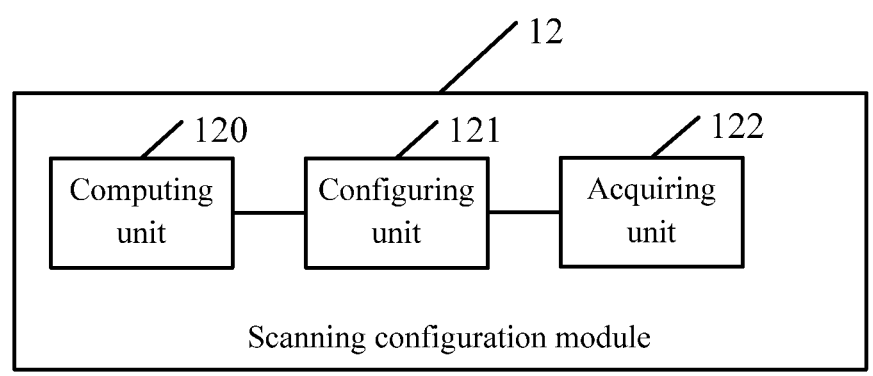
FIG. 8 is a specific schematic structural diagram of a scanning configuration module in FIG. 7.

As shown in FIG. 8, the scanning configuration module 12 includes a computing unit 120 configured to compute an appropriate target-data-partition operation group according to the scanning cost of each target data partition so that a difference between a scanning cost of each group and an average value of scanning costs of all operation groups falls within a preset range, where the operation group includes tasks of scanning of one or more target data partitions, a configuring unit 121 configured to allocate the operation group to a processing resource so as to execute parallel data scanning, and an acquiring unit 122 configured to acquire a scanning result returned by the processing resource.

The processing resource may return one result after scanning one target data partition or may return all scanning results after scanning a batch of target data partitions.

Figure 9A:
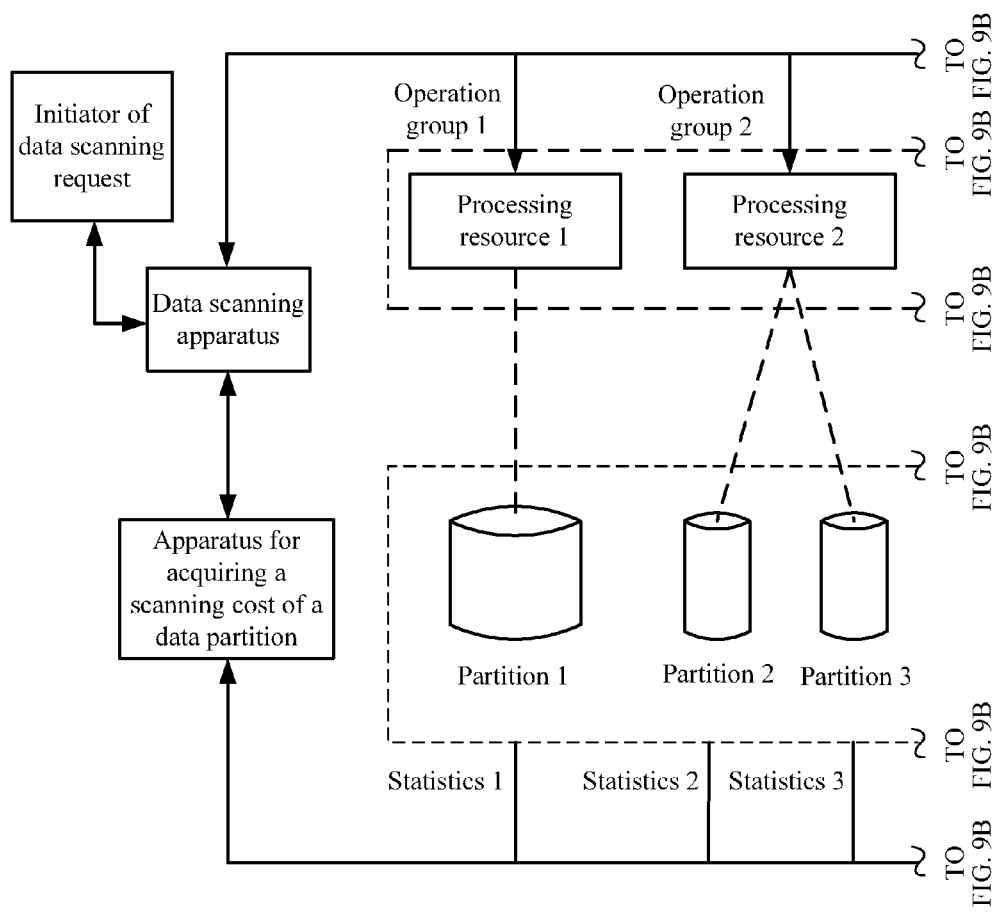
FIG. 9A and FIG. 9B are a schematic diagram showing a principle of a specific data scanning apparatus according to an embodiment of the present invention.
Figure 9B:
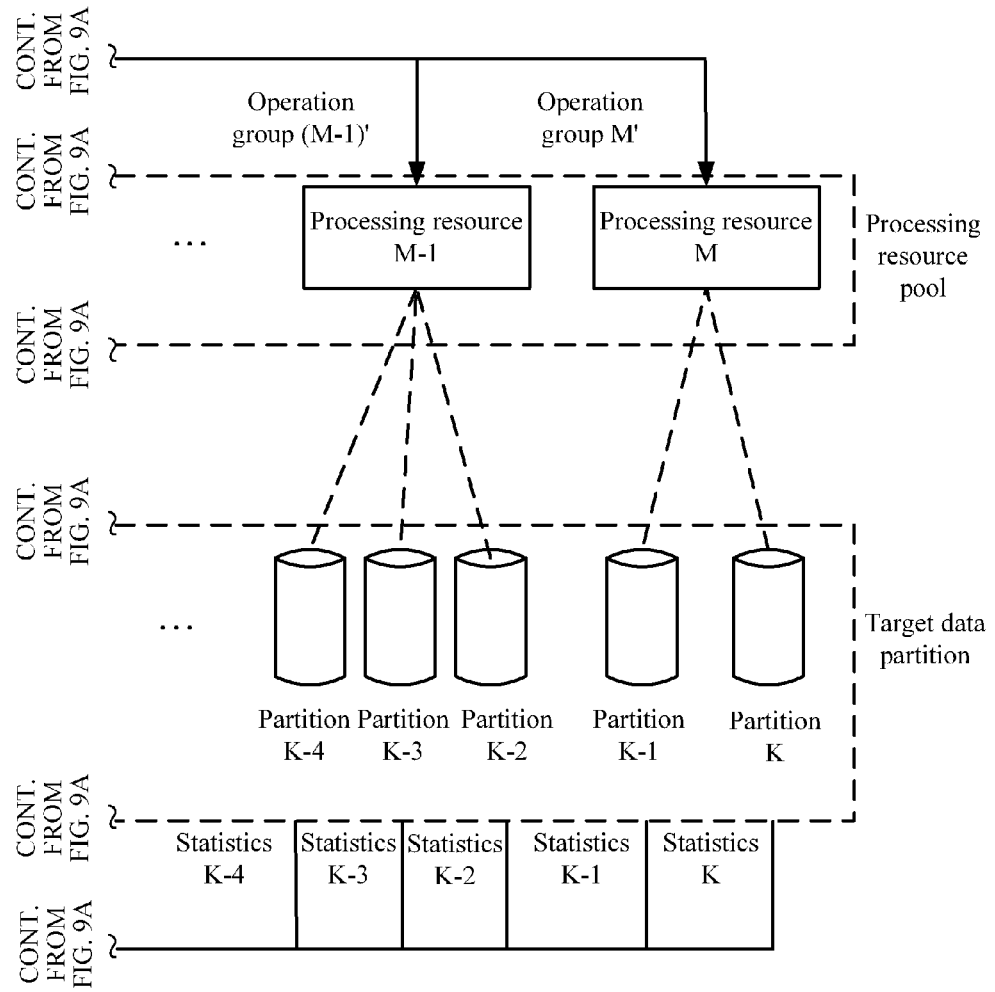

The data scanning apparatus described in the embodiment of the present invention and the apparatus for acquiring a scanning cost of a data partition described in FIG. 5 jointly implement scanning processing of a data partition. As shown in FIG. 9A and FIG. 9B, the triggering module 20 of the apparatus for acquiring a scanning cost of a data partition in the foregoing embodiment triggers the collecting module 21 to collect statistics information (including a data volume and access performance of a storage medium) of each data partition, for example, statistics 1 to statistics K shown in the figure, and the second acquiring module 22 acquires a scanning cost of each data partition by computation and generates a correspondence between a data partition and a scanning cost shown in Table 1.

The determining module 10 of the data scanning apparatus in the embodiment determines a target data partition 1 to a target data partition K that are to be scanned, referred to as a partition 1 to a partition K. The first acquiring module 11 acquires a scanning cost of each target data partition from the apparatus for acquiring a scanning cost of a data partition and the scanning configuration module 12 is grouped, according to a result of the first acquiring module 11, to an operation group 1 to an operation group M' shown in the figure, where a sum of scanning costs of target data partitions included in each operation group is not greater than an average value of scanning costs of all operation groups. The scanning configuration module 12 allocates the acquired operation group 1 to operation group M' to an idle processing resource 1 to an idle processing resource M in a processing resource pool respectively, and acquires a processing result of the processing resource 1 to the processing resource M. The sending module 13 of the data scanning apparatus returns the processing result to the initiator of the data scanning request.

In the embodiment of the present invention, by collecting a data volume of a data partition and access performance of a storage medium in which the data partition is located, a scanning cost of each data partition is estimated, and then an appropriate target-data-partition group (an operation group) is computed and allocated to an idle processing resource so that scanning time of each operation group is close to an average value of scanning costs of all operation groups and a scanning result is returned to an initiator of a data scanning request by the processing resource, namely a worker, thereby shortening waiting time of the whole scanning.

Figure 10:
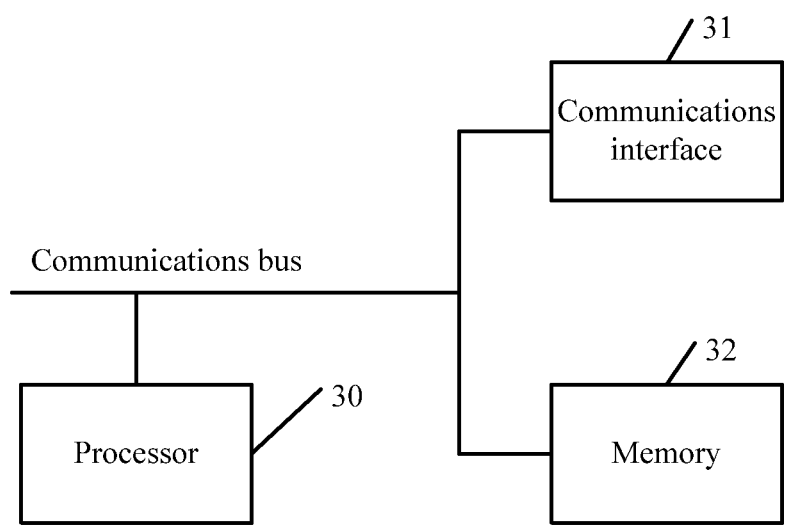
FIG. 10 is a schematic structural diagram of still another data scanning apparatus according to an embodiment of the present invention.

FIG. 10 is a schematic structural diagram of still another data scanning apparatus according to an embodiment of the present invention. The data scanning apparatus includes a processor 30, a communications interface 31, and a memory 32. The processor 30, the communications interface 31, and the memory 32 in the embodiment of the present invention may be connected by using a communications bus or in another manner.

The communications interface 31 is configured to receive a data scanning request or send a data scanning result to an initiator of a data scanning request.

The memory 32 is configured to store a program.

The processor 30 may be configured to invoke a program, stored in the memory 32, for implementing data scanning to execute the following steps: analyzing a data scanning condition carried in a received data scanning request, determining at least one target data partition used to store data; acquiring a scanning cost of the target data partition, where the scanning cost includes waiting time of data scanning, allocating the target data partition to a processing resource according to the scanning cost so as to execute parallel data scanning, and acquiring a scanning result returned by the processing resource.

Before the processor 30 analyzes the data scanning condition that is carried in the data scanning request received by the communications interface, the processor 30 may be configured to invoke the program, stored in the memory 32, for implementing data scanning, and further execute the following steps: collecting statistics information of a data partition, where the statistics information includes a data volume of the data partition and access performance of a storage medium and acquiring and configuring a scanning cost corresponding to the data partition according to the data volume of the data partition and the access performance of the storage medium in the statistics information.

When executing the collecting of statistics information of a data partition, the processor 30 specifically executes the following steps: scanning all data of each data partition and computing the data volume of the data partition, performing sampling on data of the data partition to estimate the data volume of the data partition, or estimating a current data volume according to a data operation that is performed on the data partition after statistics of a data volume is collected for the data partition last time, and pre-configuring the access performance of the storage medium of the data partition or executing data sampling on the data partition for at least one time so as to determine the access performance of the storage medium of the data partition.

Before the processor 30 executes the collecting of statistics information of a data partition, the processor 30 may be configured to invoke the program, stored in the memory 32, for implementing data scanning, and further execute triggering, according to an event or in a periodical manner, of an operation of collecting the statistics information of the data partition.

That the processor 30 allocates the target data partition to a processing resource according to the scanning cost so as to execute parallel scanning includes the following steps: computing an appropriate target-data-partition operation group according to a scanning cost of each target data partition so that a difference between a scanning cost of each group and an average value of scanning costs of all operation groups falls within a preset range, where the operation group includes scanning of one or more target data partitions, and allocating the operation group to the processing resource, so as to execute parallel scanning.

After the processor 30 executes the foregoing steps, the processor 30 may be configured to invoke the program, stored in the memory 32, for implementing data scanning, and further execute the following steps: sending an acquired scanning result of the processing resource to an initiator of the data scanning request.

It can be seen from the foregoing that, in the embodiment of the present invention, by acquiring a to-be-scanned target data partition and a scanning cost of the target data partition, corresponding computing processing is performed, and the target data partition, after being grouped, is allocated to a processing resource to execute scanning, thereby avoiding a problem that total scanning time is excessively long due to imbalanced tasks of processing resources, that is, shortening waiting time of data scanning.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a disk, an optical disc, a read-only memory (ROM), or a random access memory (RAM).

The disclosed are merely exemplary embodiments of the present invention, but are not intended to limit the scope of the present invention. Equivalent variation figured out according to the claims shall fall within the protection scope of the present invention.

What is claimed is:

1. A data scanning method, comprising:
analyzing, by a computer processor, a data scanning condition carried in a received data scanning request;
determining, by the computer processor, target data partitions used to store data;
acquiring, by the computer processor, scanning costs of the target data partitions, wherein the scanning costs comprise waiting time of data scanning;
computing, by the computer processor, a number of operation groups to allocate for the target data partitions based on the scanning costs, wherein each of the operation groups comprises scanning of one or more of the target data partitions;
determining, by the computer processor, an average scanning cost of the operation groups;
balancing, by the computer processor, tasks of one or more computer processing resources by:
    allocating, by the computer processor, the target data partitions to the operation groups so that a difference between a scanning cost of each of the operation groups and the average scanning cost falls within a preset range; and allocating, by the computer processor, the operation groups to the one or more computer processing resources to execute parallel scanning; and acquiring, by the computer processor, a scanning result returned by the one or more computer processing resources.

2. The method according to claim 1, wherein, before analyzing the data scanning condition carried in the received data scanning request, the method further comprises:

collecting statistics information of a data partition, wherein the statistics information comprises a data volume of the data partition and access performance of a storage medium; and acquiring and configuring a scanning cost corresponding to the data partition according to the data volume of the data partition and the access performance of the storage medium in the statistics information.

3. The method according to claim 2, wherein collecting the statistics information of the data partition comprises:

scanning all data of each data partition and computing the data volume of the data partition;

performing sampling on data of the data partition to estimate the data volume of the data partition; or estimating a current data volume according to a data operation that is performed on the data partition after statistics of a data volume is collected for the data partition a last time.

4. The method according to claim 2, wherein collecting the statistics information of the data partition comprises pre-configuring the access performance of the storage medium of the data partition or executing data sampling on the data partition for at least one time to determine the access performance of the storage medium of the data partition.

5. The method according to claim 2, wherein, before collecting the statistics information of the data partition, the method further comprises triggering, according to an event or in a periodical manner, an operation of collecting the statistics information of the data partition.

6. The method according to claim 1, further comprising sending the scanning result to an initiator of the received data scanning request.

7. A non-transitory computer readable storage medium storing a program, wherein the program, when executed by a computer, causes the computer to:

analyze a data scanning condition carried in a received data scanning request;

determine target data partitions used to store data;

acquire scanning costs of the target data partitions, wherein the scanning costs comprise waiting time of data scanning;

compute a number of operation groups to allocate for the target data partitions based on the scanning costs, wherein each of the operation groups comprises scanning of one or more of the target data partitions;

determine an average scanning cost of the operation groups;

balance tasks of one or more computer processing resources by causing the computer to:

allocate the target data partitions to the operation groups so that a difference between a scanning cost of each of the operation groups and the average scanning cost falls within a preset range; and allocate the operation groups to the one or more computer processing resources to execute parallel scanning; and acquire a scanning result returned by the one or more computer processing resources.

8. The non-transitory computer readable storage medium according to claim 7, wherein the program, when executed by the computer, further causes the computer to:

collect statistics information of a data partition, wherein the statistics information comprises a data volume of the data partition and access performance of a second storage medium; and acquire and configure a scanning cost corresponding to the data partition according to the data volume of the data partition and the access performance of the second storage medium in the statistics information.

9. The non-transitory computer readable storage medium according to claim 8, wherein the program, when executed by the computer, causes the computer to collect the statistics information by causing the computer to:

scan all data of each data partition and compute the data volume of the data partition;

perform sampling on data of the data partition to estimate the data volume of the data partition; or estimate a current data volume according to a data operation that is performed on the data partition after statistics of a data volume is collected for the data partition a last time.

10. The non-transitory computer readable storage medium according to claim 8, wherein the program, when executed by the computer, further causes the computer to pre-configure the access performance of the storage medium of the data partition or execute data sampling on the data partition for at least one time to determine the access performance of the second storage medium of the data partition.

11. The non-transitory computer readable storage medium according to claim 9, wherein the program when executed by the computer, further causes the computer to trigger, according to an event or in a periodical manner, the computer to collect the statistics information.

12. The non-transitory computer readable storage medium according to claim 9, wherein the program, when executed by the computer, further causes the computer to send the scanning result to an initiator of the received data scanning request.

13. A data scanning apparatus, comprising:

a memory;

a processor coupled to the memory; and a communications interface coupled to the memory and the processor, wherein the communications interface is configured to receive a data scanning request or send a data scanning result to a device that initiates the data scanning request, wherein the memory stores program code, and wherein the processor is configured to invoke the program code stored in the memory:

analyze a data scanning condition that is carried in the data scanning request received by the communications interface;

determine target data partitions used to store data;

acquire scanning costs of the target data partitions, wherein the scanning costs comprise waiting time of data scanning;

compute a number of operation groups to allocate for the target data partitions based on the scanning costs, wherein each of the operation groups comprises scanning of one or more of the target data partitions;

determine an average scanning cost of the operation groups;

balance tasks of one or more computer processing resources by;
  allocating the target data partitions to the operation groups so that a difference between a scanning cost of each of the operation groups and the average scanning cost falls within a preset range; and
  allocating the operation groups to the one or more computer processing resources to execute parallel scanning; and acquire a scanning result returned by the one or more computer processing resources.

14. The apparatus according to claim 13, wherein before the processor is configured to analyze the data scanning condition carried in the data scanning request received by the communications interface, the processor is configured to invoke the program code stored in the memory and to:

collect statistics information of a data partition, wherein the statistics information comprises a data volume of the data partition and access performance of a storage medium; and acquire and configure a scanning cost corresponding to the data partition according to the data volume of the data partition and the access performance of the storage medium in the statistics information.

15. The apparatus according to claim 14, wherein collecting the statistics information of the data partition by the processor comprises:

scanning all data of each data partition and computing the data volume of the data partition;

performing sampling on data of the data partition to estimate the data volume of the data partition; or estimating a current data volume according to a data operation that is performed on the data partition after statistics of a data volume is collected for the data partition a last time.

16. The apparatus according to claim 14, wherein collecting the statistics information of the data partition by the processor comprises pre-configuring the access performance of the storage medium of the data partition or executing data sampling on the data partition for at least one time to determine the access performance of the storage medium of the data partition.

17. The apparatus according to claim 14, wherein before the processor collects the statistics information of the data partition, the processor is configured to invoke the program code stored in the memory to trigger, according to an event or in a periodical manner, an operation of collecting the statistics information of the data partition.

18. The apparatus according to claim 13, wherein the processor is configured to invoke the program code stored in the memory to send an acquired scanning result returned by the one or more computer processing resources to an initiator of the data scanning request.

19. The apparatus according to claim 13, wherein the one or more processing resources comprise a plurality of idle threads in a worker pool, wherein the operations groups are further determined based on the plurality of idle threads in the worker pool, wherein a number of the operations groups equals a number of the plurality of idle threads, and wherein a number of the target data partitions is greater than the number of the plurality of idle threads.

* * * * *

UNITED STATES PATENT AND TRADEMARK OFFICE
CERTIFICATE OF CORRECTION

PATENT NO. : 9,875,279 B2  
APPLICATION NO. : 14/585874  
DATED : January 23, 2018  
INVENTOR(S) : Jijun Wen and Zhongqing Xu Page 1 of 1

It is certified that error appears in the above-identified patent and that said Letters Patent is hereby corrected as shown below:

Column 14; Line 38; Claim 11 should read:
according to claim 9, wherein the program, when executed Signed and Sealed this
Thirteenth Day of March, 2018

Andrei Iancu
*Director of the United States Patent and Trademark Office*